United States Patent [19]

Frame

[11] 4,156,641

[45] May 29, 1979

[54] CATALYTIC OXIDATION OF MERCAPTAN IN PETROLEUM DISTILLATE INCLUDING QUATERNARY AMMONIUM HYDROXIDE

[75] Inventor: Robert R. Frame, Glenview, Ill.

[73] Assignee: UOP Inc., Des Plaines, Ill.

[21] Appl. No.: 929,054

[22] Filed: Jul. 28, 1978

Related U.S. Application Data

[63] Continuation-in-part of Ser. No. 880,723, Feb. 24, 1978, Pat. No. 4,124,493.

[51] Int. Cl.$^2$ ............................................. C10G 27/06
[52] U.S. Cl. ................................................... 208/207
[58] Field of Search ................ 208/206, 207; 252/428, 252/431 N

[56] References Cited

U.S. PATENT DOCUMENTS

| | | | |
|---|---|---|---|
| 2,560,374 | 7/1951 | Shmidl | 208/206 |
| 2,744,854 | 5/1956 | Urban, Jr. | 208/206 |
| 3,164,544 | 1/1965 | Bowers | 208/206 |
| 4,033,860 | 7/1977 | Carlson | 208/206 |
| 4,121,997 | 10/1978 | Frame | 208/206 |
| 4,124,493 | 11/1978 | Frame | 208/206 |
| 4,124,494 | 11/1978 | Frame | 208/207 |
| 4,127,474 | 11/1978 | Frame | 208/207 |

*Primary Examiner*—George Crasanakis
*Attorney, Agent, or Firm*—James R. Hoatson, Jr.; Robert W. Welch; William H. Page, II

[57] ABSTRACT

A process for treating a mercaptan-containing sour petroleum distillate is disclosed. The process comprises passing said distillate in admixture with an oxidizing agent through a fixed bed of a supported mercaptan oxidation catalyst at oxidation conditions in the presence of a quaternary ammonium hydroxide.

14 Claims, No Drawings

CATALYTIC OXIDATION OF MERCAPTAN IN PETROLEUM DISTILLATE INCLUDING QUATERNARY AMMONIUM HYDROXIDE

CROSS-REFERENCE TO RELATED APPLICATIONS

This application is a continuation-in-part of a copending application Ser. No. 880,723 filed Feb. 24, 1978 which issued as U.S. Pat. No. 4,124,493.

This invention relates to a process particularly adapted to the conversion of difficultly oxidizable mercaptans contained in a sour petroleum distillate. Processes for the treatment of sour petroleum distillates wherein the distillate is treated in contact with an oxidation catalyst in the presence of an oxidizing agent at alkaline reaction conditions have become well known and widely practiced in the petroleum refining industry. Said processes are typically designed to effect the oxidation of offensive mercaptans contained in a sour petroleum distillate with the formation of innocuous disulfides—a process commonly referred to as sweetening. Depending on the source of the petroleum from which the sour distillate was derived, the boiling range of the distillate itself, and possibly the method of processing the petroleum to produce the distillate, the distillates vary widely with respect to the concentration, molecular weight and complexity of the mercaptans contained therein, and the sweetening process will vary accordingly.

One such process relates to olefin-containing petroleum distillates. When said distillates are required to be maintained in storage for any length of time, they advantageously contain an oxidation inhibitor to obviate gum formation. The inhibitor is typically an oil-soluble phenylenediamine. When the olefin-containing distillates further contain a relatively small concentration of the more readily oxidizable mercaptans, the phenylenediamine acts as a homogeneous oxygen transfer agent and, in the presence of an alkaline reagent, promotes the oxidation of mercaptans and the formation of disulfides. It is to be noted that at least one-third of the mercaptans are consumed by interaction with the olefin content of the distillate. The process is commonly referred to as inhibitor sweetening. The homogeneous phenylenediamine is not recoverable but is expended in the sweetening process, and as the amount of the phenylenediamine required to effect an economical rate of oxidation becomes excessive, the process becomes ineffective as a sweetening process and resort must be had to other means. It is known that inhibitor sweetening, which is essentially a batch type of process more suited to the treatment of sour distillates in storage, functions only with respect to olefin-containing distillates—the olefin being essential to the inhibitor sweetening process. Over a period of time, usually measured in hours or days, the stored distillate may become doctor sweet depending on the complexity and concentration of the mercaptans contained therein. While certain quaternary ammonium compounds have been used in conjunction with the homogeneous phenylenediamine catalyst to accelerate the sweetening process as shown in U.S. Pat. No. 3,164,544, the process remains subject to the general limitations of inhibitor sweetening. Thus, inhibitor sweetening is generally ineffective with respect to sour petroleum distillates containing mercaptans other than primary and secondary mercaptans, and increasingly ineffective with respect to petroleum distillates containing in excess of about 150 ppm. mercaptan sulfur.

Sour petroleum distillates that do not respond to inhibitor sweetening, i.e., those containing the higher molecular weight and/or more complex mercaptans, or higher mercaptan concentrations, are commonly treated in contact with a heterogeneous metal phthalocyanine catalyst dispersed in an aqueous caustic solution to yield a doctor sweet product. The sour petroleum distillate and the catalyst-containing aqueous caustic solution provide a liquid-liquid system wherein mercaptans are converted to disulfides at the interface of the immiscible solutions in the presence of an oxidizing agent—usually air. This liquid-liquid system is invariably employed in a continuous type of operation requiring a substantially lesser contact time than required of inhibitor sweetening. The metal phthalocyanine catalyst, which is recovered and recycled for continuous use, is not limited to use in conjunction with an olefin-containing petroleum distillate, but is equally effective with regard to olefin-free distillates to provide a doctor-sweet product.

Certain of the higher boiling sour petroleum distillates, generally boiling in excess of about 275° F., contain highly hindered branched chain and aromatic thiols, and/or higher molecular weight tertiary and polyfunctional mercaptans, which are at most only partially soluble in the catalyst-containing caustic solution of the liquid-liquid treating system. Sour petroleum distillates containing these more difficulty oxidizable mercaptans are more effectively treated in contact with a metal phthalocyanine catalyst disposed or impregnated on a high surface area adsorptive support or carrier material—usually an activated charcoal. The distillate is treated in contact with the supported metal phthalocyanine catalyst at oxidation conditions in the presence of an alkaline reagent. One such process is described in U.S. Pat. No. 2,988,500. The oxidizing agent is most often air admixed with the distillate to be treated, and the alkaline reagent is most often an aqueous caustic solution charged continuously to the process or intermittently as required to maintain the catalyst in a caustic-wetted state.

It is an object of this invention to present a novel process particularly useful in the treatment of sour petroleum distillates containing the more difficultly oxidizable mercaptans.

In one of its broad aspects, the present invention embodies a process which comprises passing a mercaptan-containing sour petroleum distillate in admixture with an oxidizing agent through a fixed bed of a supported mercaptan oxidation catalyst in the presence of a quaternary ammonium hydroxide having the structural formula

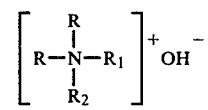

wherein R is a hydrocarbon radical containing up to about 20 carbon atoms and selected from the group consisting of alkyl, cycloalkyl, aryl, alkaryl and aralkyl, $R_1$ is a substantially straight-chain alkyl radical containing from about 5 to about 20 carbon atoms, and $R_2$ is selected from the group consisting of aryl, aralkyl and alkaryl.

One of the more specific embodiments concerns a process which comprises passing said sour petroleum distillate in admixture with air through a fixed bed of a charcoal-supported cobalt phthalocyanine catalyst in the presence of a dimethylbenzylalkylammonium hydroxide wherein the alkyl substituent is a substantially straight-chain alkyl radical containing from about 5 to about 20 carbon atoms.

A still more specific embodiment relates to a process for treating a mercaptan-containing sour petroleum distillate which comprises passing said distillate in admixture with air through a fixed bed of charcoal-supported cobalt phthalocyanine monosulfonate catalyst at a liquid hourly space velocity of from about 0.1 to about 10 in the presence of from about 1 to about 500 ppm. dimethylbenzylalkylammonium hydroxide based on the weight of said distillate, the alkyl substituent of said dimethylbenzylalkylammonium hydroxide being a substantially straight-chain alkyl radical containing from about 12 to about 18 carbon atoms.

Other objects and embodiments of this invention will become apparent in the following detailed specification.

The mercaptan oxidation catalyst employed herein can be any of the various mercaptan oxidation catalysts known to the treating art as effective to catalyze the oxidation of mercaptans contained in a sour petroleum distillate with the formation of polysulfide oxidation products. Said catalysts include the metal compounds of tetrapyridinoporphyrazine described in U.S. Pat. No. 3,980,582, e.g., cobalt tetrapyridinoporphyrazine; porphyrin and metaloporphyrin catalysts as described in U.S. Pat. No. 2,966,453, e.g., cobalt tetraphenylporphyrin sulfonate; corrinoid catalysts as described in U.S. Pat. No. 3,252,892, e.g., cobalt corrin sulfonate; chelate organometallic catalysts such as described in U.S. Pat. No. 2,918,426, e.g., the condensation product of an aminophenol and a metal of Group VIII; and the like. Metal phthalocyanines are a preferred class of mercaptan oxidation catalysts.

The metal phthalocyanines employed as a mercaptan oxidation catalyst generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine and the like. Cobalt phthalocyanine and vanadium phthalocyanine are particularly preferred. The metal phthalocyanine is most frequently employed as a derivative thereof, the commercially available sulfonated derivatives, e.g., cobalt phthalocyanine monosulfonate, cobalt phthalocyanine disulfonate, or a mixture thereof, being particularly preferred. The sulfonated derivatives may be prepared, e.g., by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

Pursuant to the present invention, the offensive mercaptans contained in a sour petroleum distillate are oxidized to innocuous disulfides in the presence of a quaternary ammonium hydroxide represented by the structural formula

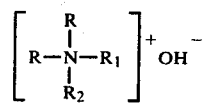

wherein R is a hydrocarbon radical containing up to about 20 carbon atoms and selected from the group consisting of alkyl, cycloalkyl, aryl, aralkyl and alkaryl, $R_1$ is a substantially straight-chain alkyl radical containing from about 5 to about 20 carbon atoms, and $R_2$ is selected from the group consisting of aryl, aralkyl and alkaryl. $R_1$ is preferably a substantially straight-chain alkyl radical containing from about 12 to about 18 carbon atoms, and $R_2$ is preferably benzyl. Preferred quaternary ammonium hydroxides thus include dimethylbenzyldodecylammonium hydroxide, dimethylbenzyltetradecylammonium hydroxide, dimethylbenzylhexadecylammonium hydroxide, dimethylbenzyloctadecylammonium hydroxide and the like. Other suitable quaternary ammonium hydroxides include dimethylphenylpentylammonium hydroxide, diethylphenylpentylammonium hydroxide, dipropylphenylpentylammonium hydroxide, dimethylphenylhexylammonium hydroxide, diethylphenylhexylammonium hydroxide, dipropylphenylhexylammonium hydroxide, dimethylphenyloctylammonium hydroxide, diethylphenyloctylammonium hydroxide, dipropylphenyloctylammonium hydroxide, dimethylphenyldecylammonium hydroxide, diethylphenyldecylammonium hydroxide, dipropylphenyldecylammonium hydroxide, dimethylphenyldodecylammonium hydroxide, diethylphenyldodecylammonium hydroxide, dipropylphenyldodecylammonium hydroxide, dimethylphenyltetradecylammonium hydroxide diethylphenyltetradecylammonium hydroxide, dipropylphenyltetradecylammonium hydroxide, dimethylphenylhexadecylammonium hydroxide, diethylphenylhexadecylammonium hydroxide, dipropylphenylhexadecylammonium hydroxide, dimethylphenyloctadecylammonium hydroxide, diethylphenyloctadecylammonium hydroxide, dipropylphenyloctadecylammonium hydroxide, dimethylphenyleicosylammonium hydroxide, diethylphenyleicosylammonium hydroxide, dipropylphenyleicosylammonium hyroxide, dimethylnaphthylpentylammonium hydroxide, diethylnaphthylpentylammonium hydroxide, dipropylnaphthylpentylammonium hydroxide, dimethylnaphthylhexylammonium hydroxide, diethylnaphthylhexylammonium hydroxide, dipropylnaphthylhexylammonium hydroxide, dimethylnaphthyloctylammonium hydroxide, diethylnaphthyloctylammonium hydroxide, dipropylnaphthyloctylammonium hydroxide, dimethylnaphthyldecylammonium hydroxide, diethylnaphthyldecylammonium hydroxide, dipropylnaphthyldecylammonium hydroxide, dimethylnaphthyldodecylammonium hydroxide, diethylnaphthyldodecylammonium hydroxide, dipropylnaphthyldodecylammonium hydroxide, dimethylnaphthyltetradecylammonium hydroxide, diethylnaphthyltetradecylammonium hydroxide, dipropylnaphthyltetradecylammonium hydroxide, dimethylnaphthylhexadecylammonium hydroxide, diethylnaphthylhexadecylammonium hydroxide, dipropylnaphthylhexadecylammonium hydroxide, dimethylnaphthyloctadecylammonium hydroxide, diethylnaphthyloctadecylammonium hydroxide, dipropylnaphthyloctadecylammonium hydroxide, dimethylbenzylpentylammonium hydroxide, diethylbenzylpentylammonium hydroxide, dipropylbenzylpentylammonium hydroxide, dimethylbenzylhexylammonium hydroxide, diethylbenzylhexylammonium hydroxide, dipropylbenzylhexylammonium hydroxide, dimethylbenzyloctylammonium hydroxide, diethylbenzyloctylammonium hydroxide, dipropylbenzyloctylammonium hydroxide, dimethylbenzyldecylammonium hydroxide, diethylbenzyldecylammonium hydroxide, dipropylbenzyldecylammonium hydroxide, diethylbenzyldodecylammonium hydroxide, dipropylbenzyldodecylammonium hydroxide, diethylbenzyltetradecylammonium hydroxide, dipropylbenzyltetradecylammonium hydroxide, diethylbenzylhexadecylammonium hydroxide, dipropylbenzylhexadecylammonium hydroxide, diethylbenzyloctadecylammonium hydroxide, dipropylbenzyloctadecylammonium hydroxide, dimethylbenzyleicosylammonium hydroxide, diethylbenzyleicosylammonium hydroxide, dipropylbenzyleicosylammonium hydroxide, dimethyltolylpentylammonium hydroxide, diethyltolylpentylammonium hydroxide, dipropyltolylpentylammonium hydroxide, dimethyltolylhexylammonium hydroxide, diethyltolylhexylammonium hydroxide, dipropyltolylhexylammonium hydroxide, dimethyltolyloctylammonium hydroxide, diethyltolyloctylammonium hydroxide, dipropyltolyloctylammonium hydroxide, dimethyltolyldecylammonium hydroxide, diethyltolyldecylammonium hydroxide, dipropyltolyldecylammonium hydroxide, dimethyltolyldodecylammonium hydroxide, diethyltolyldodecylammonium hydroxide, dipropyltolyldodecylammonium hydroxide, dimethyltolyltetradecylammonium hydroxide, diethyltolyltetradecylammonium hydroxide, dipropyltolyltetradecylammonium hydroxide, dimethyltolylhexadecylammonium hydroxide, diethyltolylhexadecylammonium hyroxide, dipropyltolylhexadecylammonium hydroxide, dimethyltolyloctadecylammonium hydroxide, diethyltolyloctadecylammonium hyroxide, dipropyltolyloctadecylammonium hydroxide, dimethyltolyleicosylammonium hydroxide, diethyltolyleicosylammonium hydroxide, dipropyltolyleicosylammonium hydroxide, and the like.

The quaternary ammonium hydroxide is conveniently employed as an aqueous or alcoholic solution thereof—a molar concentration of from about 0.5 to about 5 being suitably effective. It is a preferred practice to prewet the catalyst bed with the quaternary ammonium hydroxide prior to contact with the sour petroleum distillate—the quaternary ammonium hyroxide being subsequently charged to the process in admixture with the sour petroleum distillate charged thereto, continuously or intermittently as required to maintain from about a 1 to about a 500 ppm. concentration based on the weight of the sour petroleum distillate.

For use in the fixed bed treating operation, the metal phthalocyanine can be adsorbed or impregnated on a solid adsorbent support in any conventional or otherwise convenient manner. In general, the support or carrier material in the form of spheres, pills, pellets, granules or other particles of uniform or irregular shape and size, is dipped, soaked, suspended or otherwise immersed in an aqueous or alcoholic solution and/or dispersion of the metal phthalocyanine catalyst, or the aqueous or alcoholic solution and/or dispersion may be sprayed onto, poured over or otherwise contacted with the adsorbent support. In any case, the aqueous solution and/or dispersion is separated, and the resulting composite is allowed to dry under ambient temperature conditions, or dried at an elevated temperature in an oven or in a flow of hot gases, or in any other suitable manner.

It is generally preferable to adsorb as much metal phthalocyanine on the adsorbent support or carrier material as will form a stable catalytic composite—generally up to about 25 wt. %, although a lesser amount in the range of from about 0.1 to about 10 wt. % affords a suitably active catalytic composite. One suitable and convenient method comprises predisposing the solid support or carrier material in the distillate treating zone or chamber as a fixed bed, and passing the metal phthalocyanine solution and/or dispersion through the bed in order to form the catalytic composite in situ. This method allows the solution and/or dispersion to be recycled one or more times to achieve a desired concentration of the metal phthalocyanine on the adsorbent support. In still another method, the adsorbent support may be predisposed in said treating chamber and the chamber thereafter filled with the metal phthalocyanine solution and/or dispersion to soak the support for a predetermined period, thereby forming the catalytic composite in situ.

The metal phthalocyanine catalyst can be adsorbed or impregnated on any of the well-known solid adsorbent materials generally utilized as a catalyst support. Preferred adsorbent materials include the various charcoals, produced by the destructive distillation of wood, peat, lignite, nutshells, bones and other carbonaceous matter, and preferably such charcoals as have been heat treated or chemically treated or both, to form a highly porous particle structure having increased adsorbent capacity and generally defined as activated carbon or charcoal. Said adsorbent materials also include the naturally occurring clays and silicates, e.g., diatomaceous earth, fuller's earth, kieselguhr, attapulgus clay, feldspar, montmorillonite, halloysite, kaolin and the like, and also the naturally occurring or synthetically prepared refractory inorganic oxides such as alumina, silica, zirconia, thoria, boria, etc., or combinations thereof like silica-alumina, silica-zirconia, alumina-zirconia, etc. Any particular solid adsorbent material is selected with regard to its stability under conditions of its intended use. For example, in the treatment of a sour petroleum distillate heretofore described, the solid adsorbent carrier material should be insoluble in, and otherwise inert to, the petroleum distillate at the alkaline reaction conditions existing in the treating zone. In the latter case, charcoal, and particularly activated charcoal, is preferred because of its capacity for the metal phthalocyanine, and because of its stability under treating conditions.

The process of this invention can be effected in accordance with prior art treating conditions. The process is usually effected at ambient temperature conditions, although higher temperatures up to about 150° C. are suitably employed. Pressures of up to about 1000 psi. or more are operable, although atmospheric or substantially atmospheric pressures are entirely suitable. Contact times equivalent to a liquid hourly space velocity of from about 1 to about 100 or more are effective to achieve a desired reduction in the mercaptan content of a sour petroleum distillate, an optimum contact time being dependent on the size of the treating zone, the quantity of catalyst contained therein, and the character of the distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing gas may be employed. The sour petroleum distillate may be passed upwardly or downwardly through the catalyst bed. The sour petroleum distillate may contain sufficient entrained air, but generally added air is admixed with the distillate and charged to the treating zone concurrently therewith. In some cases, it may be of advantage to charge the air separately to the treating zone and countercurrent to the distillate separately charged thereto.

The sour petroleum distillates vary widely in composition depending on the source of the petroleum from which the distillate was derived, the boiling range of the distillate, and possibly the method of processing the petroleum to produce the distillate. The process of the present invention is particularly adapted to the treatment of petroleum distillates boiling in excess of about 135° C., e.g., kerosene, jet fuel, fuel oil, naphtha and the like. These higher boiling distillates generally contain the more difficultly oxidizable mercaptans, e.g., the highly hindered branched chain and aromatic thiols—especially the higher molecular weight tertiary and polyfunctional mercaptans.

The following example is presented in illustration of one preferred embodiment of the invention and is not intended as an undue limitation on the generally broad scope of the invention as set out in the appended claims.

EXAMPLE

A sour kerosene feed stock boiling in the 352°–454° F. range and containing about 450 ppm. mercaptan sulfur is converted to a doctor sweet product on charging the same downflow through a charcoal-supported cobalt phthalocyanine monosulfonate catalyst at an LHSV of about 0.5—said catalyst being disposed as a fixed bed in a vertical tubular reactor. The catalyst bed consists of about 1 wt. % cobalt phthalocyanine monosulfonate adsorbed on 10 × 30 mesh activated charcoal particles. The sour kerosene is charged under about 45 psig. of air—sufficient to provide about twice the stoichiometric amount of oxygen required to oxidize the mercaptan content of the kerosene. Pursuant to one preferred embodiment of this invention, the catalyst bed is initially wetted with a 2 molar aqueous dimethylbenzylalkylammonium hydroxide solution, about 10cc of said solution per 100cc of catalyst being subsequently added to the catalyst bed at 12 hour intervals admixed with the sour kerosene charged thereto. The dimethylbenzylalkylammonium hyroxide employed comprises a mixture of dimethylbenzyldodecylammonium hydroxide, dimethylbenzyltetradecylammonium hydroxide, dimethylbenzylhexadecylammonium hydroxide and dimethylbenzyloctadecylammonium hydroxide.

I claim as my invention:

1. A process for treating a mercaptan-containing sour petroleum distillate which comprises passing said distillate in admixture with an oxidizing agent through a fixed bed of a supported mercaptan oxidation catalyst in the presence of a quaternary ammonium hydroxide having the structural formula

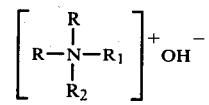

wherein R is a hydrocarbon radical containing up to about 20 carbon atoms and selected from the group consisting of alkyl, cycloalkyl, aryl, aralkyl and alkaryl, $R_1$ is a substantially straight-chain alkyl radical containing from about 5 to about 20 carbon atoms, and $R_2$ is selected from the group consisting of aryl, aralkyl and alkaryl.

2. The process of claim 1 further characterized in that said mercaptan oxidation catalyst is a metal phthalocyanine impregnated on a solid adsorptive support.

3. The process of claim 1 further characterized in that said mercaptan oxidation catalyst is a metal phthalocyanine impregnated on an activated charcoal support.

4. The process of claim 1 further characterized in that said mercaptan oxidation catalyst is a cobalt phthalocyanine.

5. The process of claim 1 further characterized in that said mercaptan oxidation catalyst is cobalt phthalocyanine monosulfonate.

6. The process of claim 1 further characterized in that said mercaptan oxidation catalyst comprises from about 0.1 to about 10 wt. % metal phthalocyanine impregnated on a solid adsorptive support.

7. The process of claim 1 further characterized in that said quaternary ammonium compound is a dimethylbenzylalkylammonium hydroxide wherein the alkyl substituent contains from about 5 to about 20 carbon atoms.

8. The process of claim 1 further characterized in that said quaternary ammonium hydroxide is a dimethylbenzylalkylammonium hydroxide wherein the alkyl substituent contains from about 12 to about 18 carbon atoms.

9. The process of claim 1 further characterized in that said quaternary ammonium hyroxide is dimethylbenzyldodecylammonium hydroxide.

10. The process of claim 1 further characterized in that said quaternary ammonium hydroxide is dimethylbenzyltetradecylammonium hydroxide.

11. The process of claim 1 further characterized in that said quaternary ammonium hydroxide is dimethylbenzylhexadecylammonium hydroxide.

12. The process of claim 1 further characterized in that said quaternary ammonium hyroxide is dimethylbenzyloctadecylammonium hydroxide.

13. The process of claim 1 further characterized in that said quaternary ammonium hydroxide is present in an amount equivalent to from about 1 to about 500 ppm. based on the weight of the sour petroleum distillate.

14. The process of claim 1 further characterized in that said sour petroleum distillate is passed through said catalyst bed at a liquid hourly space velocity of from about 0.1 to about 10.